(12) United States Patent
Victor et al.

(10) Patent No.: US 7,227,594 B2
(45) Date of Patent: Jun. 5, 2007

(54) DISPLAY DEVICE USING OPTICAL MODULATOR EQUIPPED WITH LENS SYSTEM HAVING IMPROVED NUMERICAL APERTURE

(75) Inventors: Yurlov Victor, Gyeonggi-do (KR); Haeng Seok Yang, Gyeonggi-do (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 11/433,637

(22) Filed: May 12, 2006

(65) Prior Publication Data

US 2006/0262404 A1    Nov. 23, 2006

(30) Foreign Application Priority Data

May 12, 2005    (KR)    ............... 10-2005-0039808

(51) Int. Cl.
*G02F 1/00*    (2006.01)
(52) U.S. Cl. .................. 348/774; 348/771; 353/31; 359/291; 359/292; 359/298
(58) Field of Classification Search ............ 359/223, 359/224, 290–292, 295, 298; 353/31; 348/203, 348/744, 755, 756, 759, 760, 770–772, 774
See application file for complete search history.

(56) References Cited

U.S. PATENT DOCUMENTS

| | | | |
|---|---|---|---|
| 6,288,829 B1 * | 9/2001 | Kimura | ............... 359/291 |
| 6,594,090 B2 * | 7/2003 | Kruschwitz et al. | ............... 353/31 |
| 6,687,041 B1 * | 2/2004 | Sandstrom | ............... 359/291 |
| 6,692,129 B2 * | 2/2004 | Gross et al. | ............... 353/31 |
| 6,801,354 B1 | 10/2004 | Payne et al. | |
| 7,018,052 B2 | 3/2006 | Huibers | |
| 7,116,380 B2 * | 10/2006 | Welch et al. | ............... 348/771 |
| 7,167,296 B2 * | 1/2007 | Meisburger | ............... 359/290 |
| 7,184,192 B2 * | 2/2007 | Sandstrom | ............... 359/290 |
| 2003/0103194 A1 * | 6/2003 | Gross et al. | ............... 353/31 |
| 2004/0196526 A1 * | 10/2004 | Roxlo et al. | ............... 359/291 |
| 2006/0082857 A1 * | 4/2006 | Song et al. | ............... 359/290 |
| 2006/0187524 A1 * | 8/2006 | Sandstrom | ............... 359/291 |

\* cited by examiner

*Primary Examiner*—Evelyn A. Lester
(74) *Attorney, Agent, or Firm*—Christensen O'Connor Johnson Kindness PLLC

(57) ABSTRACT

Disclosed herein is a display device using an optical modulator equipped with a lens system having an improved numerical aperture. The display device includes numerical aperture reducer for reducing a numeral aperture by causing +1st order diffracted light and corresponding −1st order diffracted light of a diffracted light, which have passed through a relay lens system, to approach each other.

16 Claims, 13 Drawing Sheets

DISPLAY DEVICE USING OPTICAL MODULATOR EQUIPPED WITH LENS SYSTEM HAVING IMPROVED NUMERICAL APERTURE

BACKGROUND OF THE INVENTION

1. Field of the Invention

The present invention relates generally to a display device using an optical modulator and, more particularly, to a display device using an optical modulator equipped with a lens system having an improved numerical aperture, which considerably reduces the numerical aperture of the lens system in the condensation of +1st order and −1st order diffracted light formed by the optical modulator.

2. Description of the Related Art

With the development of microtechnology, Micro-Electro-Mechanical Systems (MEMS) devices and small-sized equipment, into which MEMS devices are assembled, are attracting attention.

A MEMS device is formed on a substrate, such as a silicon substrate or a glass substrate, in microstructure form, and is a device into which an actuator for outputting mechanical actuating force and a semiconductor Integrated Circuit (IC) for controlling the actuator are electrically or mechanically combined. The fundamental feature of such a MEMS device is that an actuator having a mechanical structure is assembled in part of the device. The actuator is electrically operated using Coulomb's force between electrodes.

FIGS. 1 and 2 illustrate the constructions of representative optical MEMS devices that utilize the reflection or diffraction of light and are applied to optical switches or light modulation devices.

The optical MEMS device 1 illustrated in FIG. 1 includes a substrate 2, a substrate electrode 3 formed on the substrate 2, a cantilevered beam 6 configured to have an actuation electrode 4 that is disposed opposite and parallel to the substrate electrode 3, and a support 7 configured to support one end of the cantilevered beam 6. The cantilevered beam 6 and the substrate electrode 3 are electrically insulated from each other by a gap 8.

In the optical MEMS device 1, the cantilevered beam 6 is displaced by electrostatic attractive force or electrostatic repulsive force generated between the cantilevered beam 6 and the substrate electrode 3 depending on electrical potential applied between the substrate electrode 3 and the actuation electrode 4. For example, as illustrated by the solid and dotted lines of FIG. 1, the beam 14 is alternately displaced in directions inclined with respect to, and parallel to, the substrate electrode 3.

An optical MEMS device 11 illustrated in FIG. 2 includes a substrate 12, a substrate electrode 13 formed on the substrate 12, and a beam 14 formed across the substrate electrode 13 in bridge form. The beam 14 and the substrate electrode 13 are electrically insulated from each other by a gap 10.

The beam 14 includes a bridge member 15 configured to have a bridge shape and made of, for example, an SiN film, and an actuation electrode 16 supported by the bridge member 15 to be opposite and parallel to the substrate electrode 13, made of an Al film having a thickness of 100 nm and configured to function as a reflecting film also. The substrate 12, the substrate electrode 13 and the beam 14 may employ the same constructions and materials as those of FIG. 1. The beam 14 is constructed in a so-called bridge form, in which both ends thereof are supported.

In the optical MEMS device 11, the beam 14 is displaced by electrostatic attractive force or electrostatic repulsive force generated between the beam 14 and the substrate electrode 13 depending on electric potential applied between the substrate electrode 13 and the actuation electrode 16. For example, as illustrated by the solid and dotted lines of FIG. 2, the beam 14 is alternately displaced in directions depressed towards, and parallel to, the substrate electrode 3.

The optical MEMS devices 1 and 11 may be used as optical switches that are provided with switch functions in such a way as to radiate light onto the surfaces of actuation electrodes 4 and 16 which also function as reflecting films and detect reflected light having one direction based on the fact that the reflected directions of light are different depending on the actuated positions of the beams 6 and 14.

Furthermore, the optical MEMS devices 1 and 11 may be used as optical modulation devices for modulating the intensity of light. When the reflection of light is utilized, the intensity of light is modulated using the amount of reflected light per unit time in one direction by vibrating the beam 6 or 14. This optical modulation device employs so-called spatial modulation.

FIG. 3 illustrates the construction of a Grating Light Valve (GLV) device that was developed by Silicon Light Machine (SLM) Co. as a light intensity conversion device for a laser display, that is, a light modulator.

The GLV device 21, as illustrated in FIG. 3, is constructed in such a way that a shared substrate electrode 23, made of a high-melting-point metal, such as tungsten or titanium, and the nitride film thereof, or a polysilicon film, is formed on an insulated substrate 22, such as a glass substrate, and a plurality of beams 24, in the present embodiment, six beams 24 ($24_1$, $24_2$, $24_3$, $24_4$, $24_5$ and $24_6$), are arranged parallel to each other across the substrate electrode 23 in a bridge form. The constructions of the substrate electrode 23 and each of the beams 24 are the same as those of FIG. 2. That is, as illustrated in FIG. 3B, the beam 24 is formed by forming an actuation electrode, configured to have an Al film about 100 nm thick, and also configured to function as a reflecting film, on the surface of the bridge member parallel to the substrate electrode 23.

The beams 24, which include bridge members, and actuation side electrodes configured to be disposed on the bridge members and also to function as reflecting films, are commonly called "ribbons".

When a small amount of voltage is applied between the substrate electrode 23 and the actuation side electrodes also functioning as reflecting films, the beams 24 move toward the substrate electrode 23 due to the above-described electrostatic phenomenon. In contrast, when the application of the voltage is stopped, the beams 24 are separated from the substrate electrode 23 and return to the initial positions thereof.

In the GLV device 21, the heights of the actuation side electrodes are alternately changed by an operation in which the plurality of beams 24 approach or are separated from the substrate electrode 23 (that is, the approach or separation of the plurality of beams 24) and the intensity of light reflected by the actuation side electrodes is modulated by the diffraction of light (a single light spot is radiated onto a total of six beams 24).

The dynamic characteristics of the beams activated using electrostatic attractive force and electrostatic repulsive force are determined almost entirely by the physical properties of the SiN film formed using a CVD method or the like, and the Al film chiefly functions as a mirror.

FIG. 4 illustrates an example of an optical device using a GLV device that is an optical modulation device to which the above-described MEMS device is applied. In this example, the case of application to a laser display is described.

A laser display 51 related to the present embodiment is used as, for example, a large screen projector, particularly a digital image projector, or as an image projection device for a computer.

The laser display 51, as illustrated in FIG. 4, includes a laser light source 52, a mirror 54 positioned with respect to the laser light source 52, an illumination optical system (lens group) 56, and a GLV device 58 functioning as an optical modulation device.

Furthermore, the laser display 51 further includes a mirror 60 for reflecting laser light the intensity of which has been modulated by the GLV device 58, a Fourier lens 62, a filter 64, a diffuser 66, a mirror 68, a Galvano scanner 70, a projection optical system lens group 72, and a screen 74.

In the laser display 51 based on the conventional technology, laser light emitted from the laser light source 52 passes through the mirror 54, and enters the GLV device 58 from the illumination optical system 56.

Furthermore, laser light is spatially modulated by being diffracted by the GLV device 58, is reflected by the mirror 60, and is separated according diffraction order by the Fourier lens 62. Then, only signal components are extracted by the filter 64.

Thereafter, the image signal is decreased in laser spectrum by the diffuser 66, is propagated into space by the Galvano scanner 68 synchronized with the image signal, and is projected into the screen 72 by the projection optical system 70.

According to the conventional technology, when the interval between the diffraction gratings of the diffractive optical modulator decreases, a diffraction angle increases. Accordingly, the Numerical Aperture (NA) of the lens system located in the rear end of a projection lens or the like increases.

SUMMARY OF THE INVENTION

Accordingly, the present invention has been made keeping in mind the above problems occurring in the prior art, and an object of the present invention is to provide a display device using an optical modulator, which considerably reduces the numerical aperture of a lens system in the condensation of +1st order and −1st order diffracted light generated by the optical modulator.

In order to accomplish the above object, the present invention provides a display device using an optical modulator equipped with a lens system having an improved numerical aperture, including an illumination lens system for radiating light emitted from a light source; a diffractive optical modulator for generating diffracted light having a plurality of diffraction orders by modulating light incident from the illumination lens; a numerical aperture reducer for reducing a numeral aperture by causing positive order diffracted light and corresponding −1st order diffracted light of the diffracted light, which is generated by the diffractive optical modulator, to approach each other; and a projection system for condensing the diffracted light onto an object and performing scanning when the diffracted light having the reduced numerical aperture is emitted from the numerical aperture reducer.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
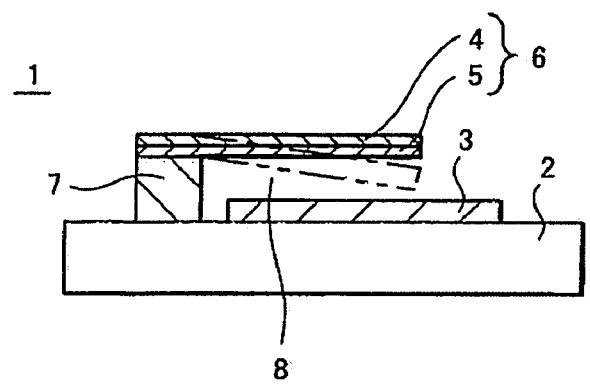
FIGS. 1 and 2 illustrate the constructions of representative optical MEMS devices that utilize the reflection or diffraction of light and are applied to optical switches or light modulation devices.
Figure 2:
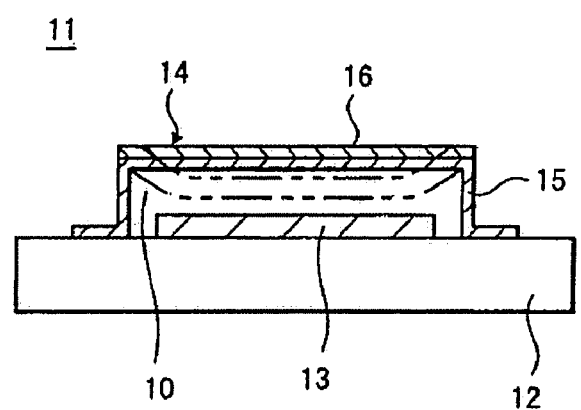
Figure 3:
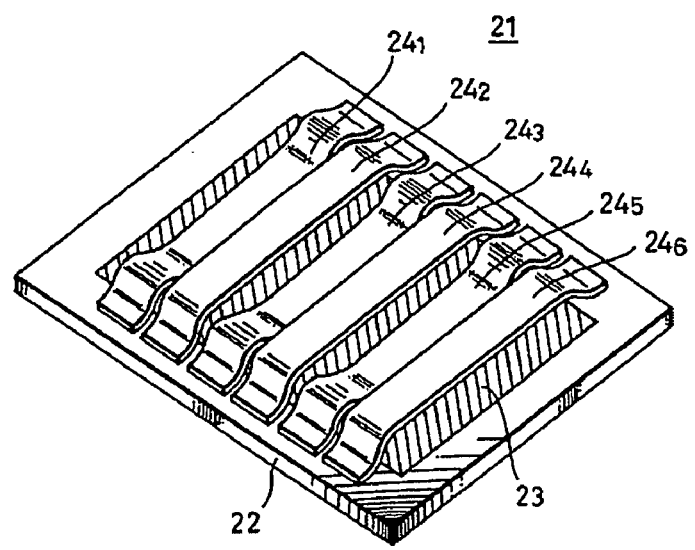
FIG. 3 illustrates the construction of a GLV device that was developed by SLM Co. as a light intensity conversion device for a laser display, that is, a light modulator.
Figure 4:
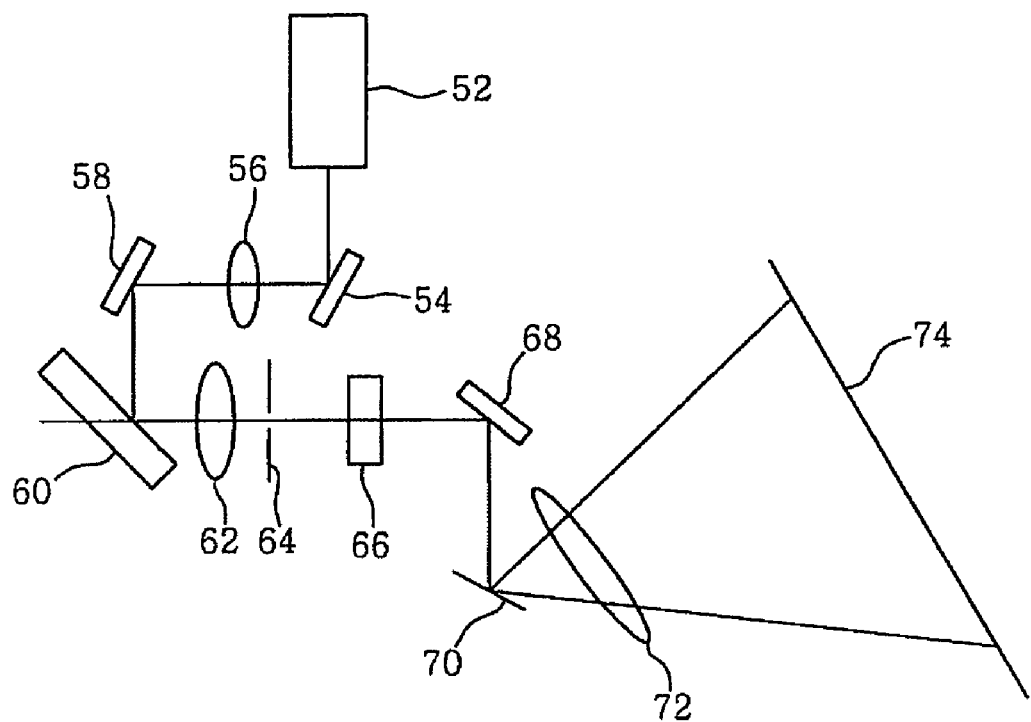
FIG. 4 illustrates an example of an optical device using a GLV device that is an optical modulation device to which the above-described MEMS device is applied.

Reference now should be made to the drawings, in which the same reference numerals are used throughout the different drawings to designate the same or similar components.

Now, with reference to FIGS. 5 to 9E, preferred embodiments of the present invention are described in detail below.

Figure 5:
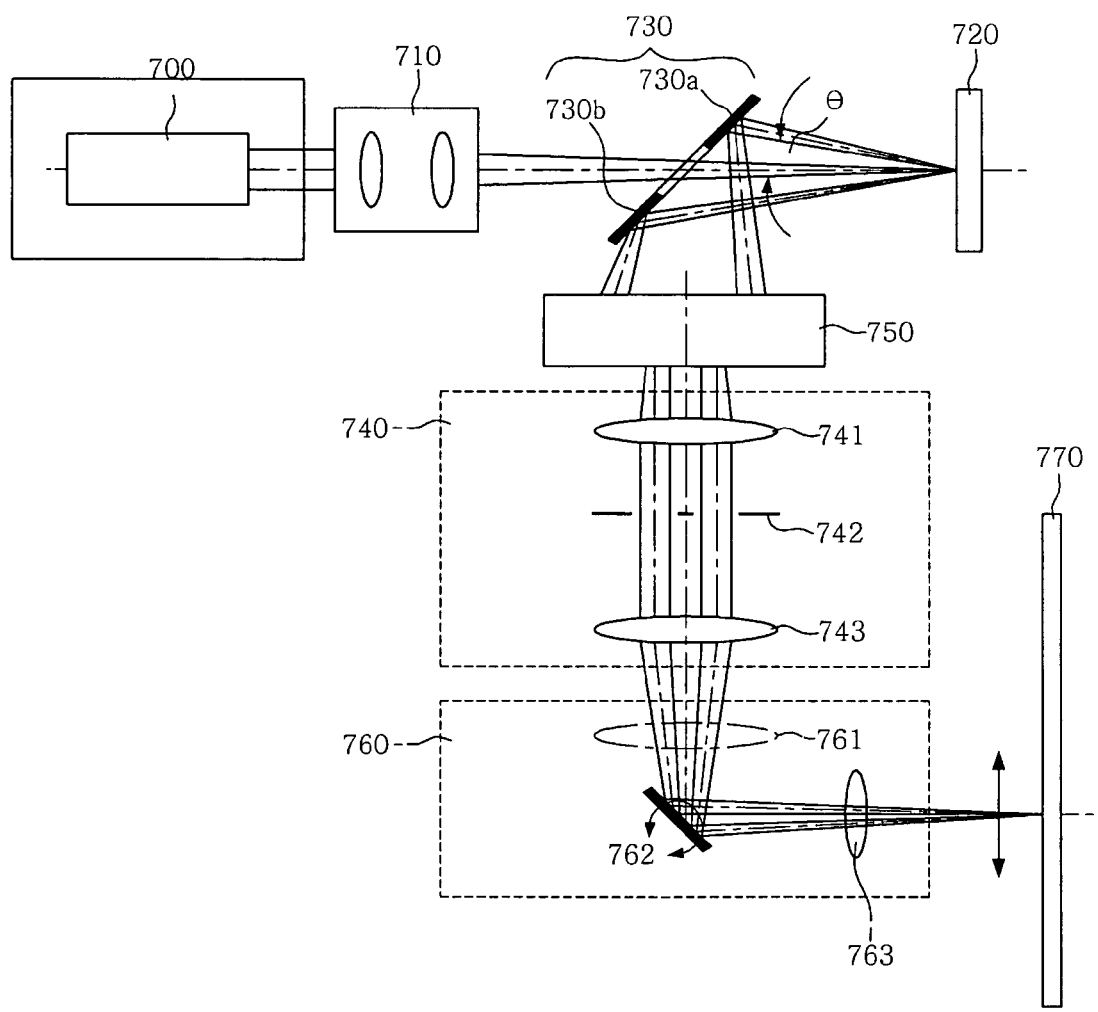
FIG. 5 is a diagram illustrating the construction of a display device using an optical modulator equipped with a lens system having an improved numerical aperture according to an embodiment of the present invention.
Figure 6A:
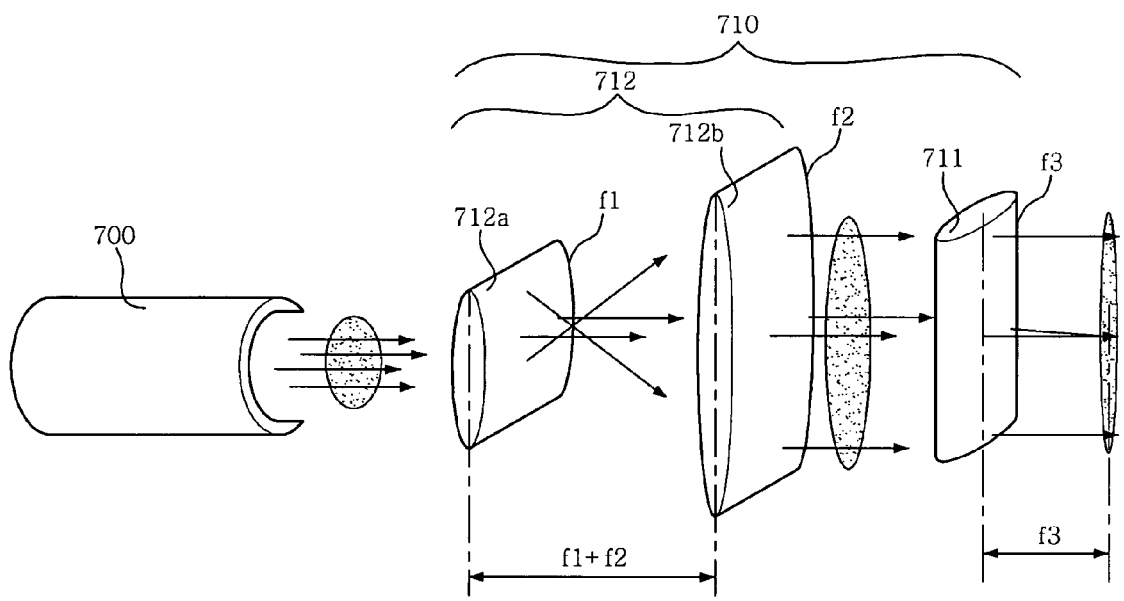
FIGS. 6A to 6C are diagrams illustrating the path of light passing through the illumination lens system of FIG. 5.
Figure 6B:
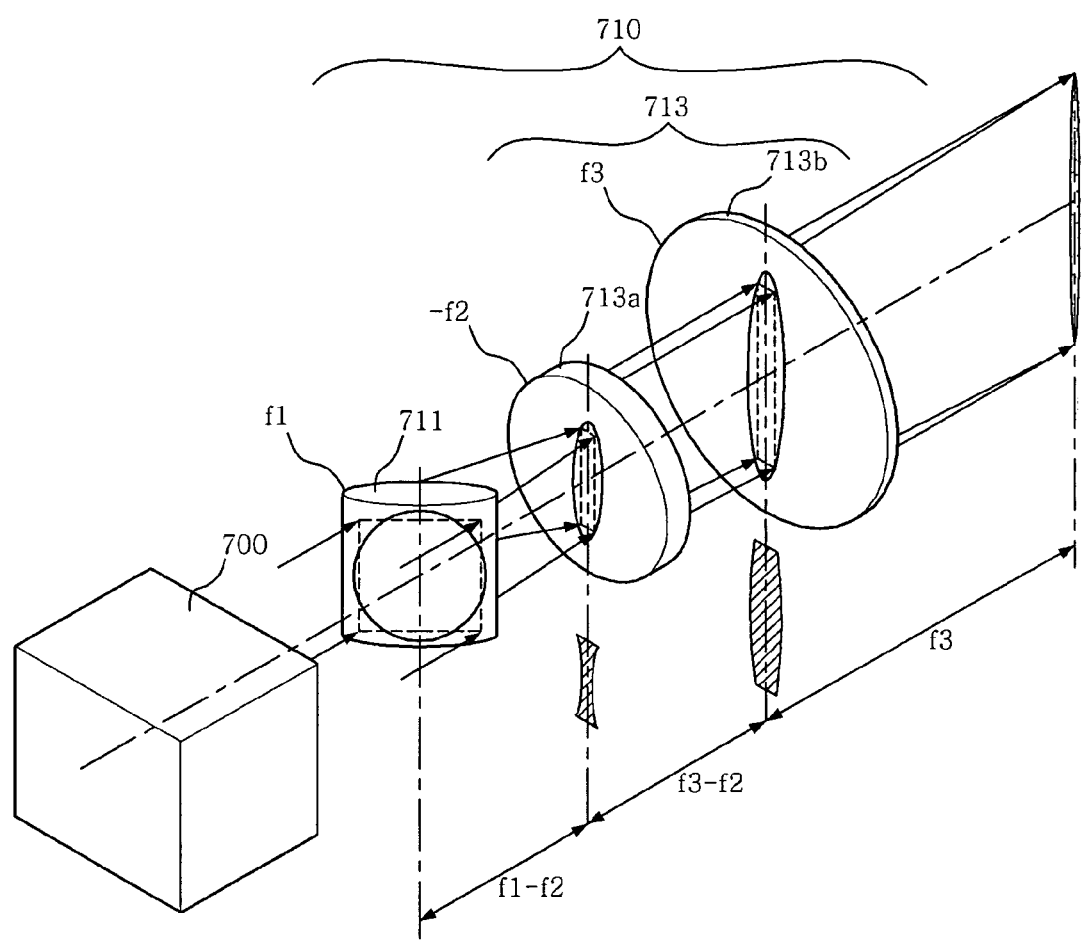
Figure 6C:
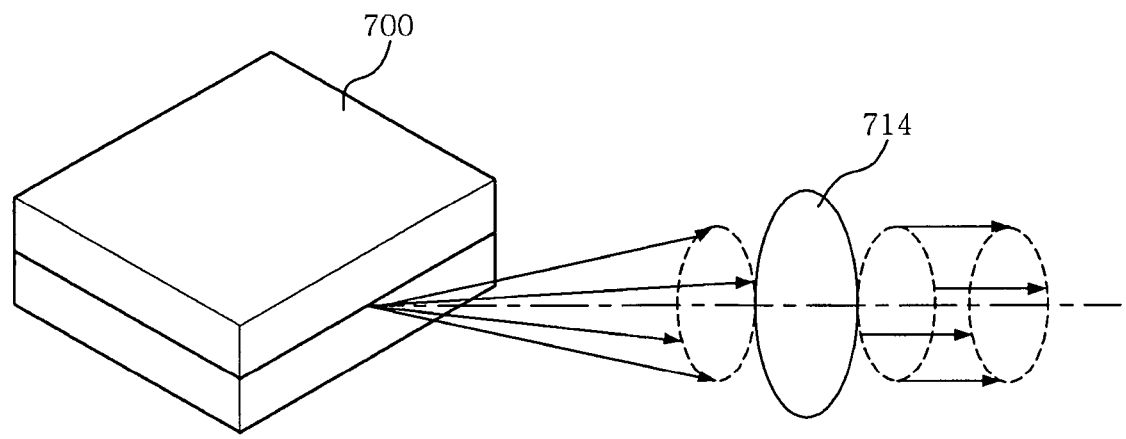

FIG. 5 is a diagram illustrating the construction of a display device using an optical modulator equipped with a lens system having an improved numerical aperture according to an embodiment of the present invention.

Referring to the drawing, the display device using an optical modulator equipped with a lens system having an improved numerical aperture according to the embodiment of the present invention includes a light source 700, an illumination lens system 710, a diffractive optical modulator 720, a reflecting mirror 730, a relay lens system 740, a numerical aperture reducer 750, a projection system 760, and a screen 770.

The light source 700 may be a light source that is formed using a semiconductor, such as a Vertical-External-Cavity Surface-Emitting-Laser (VECSEL), or Vertical Cavity Surface Emitting Laser (VCSEL), or a laser diode (LD), or super luminescent light emitting diode (SLED), or any other light source having similar properties.

Thereafter, the diffractive optical modulator 720 emits diffracted light having various orders by diffracting incident light, and the reflecting mirror 730 passes reflected light therethrough and reflects diffracted light having desired orders toward the relay lens system 740.

Figure 7:
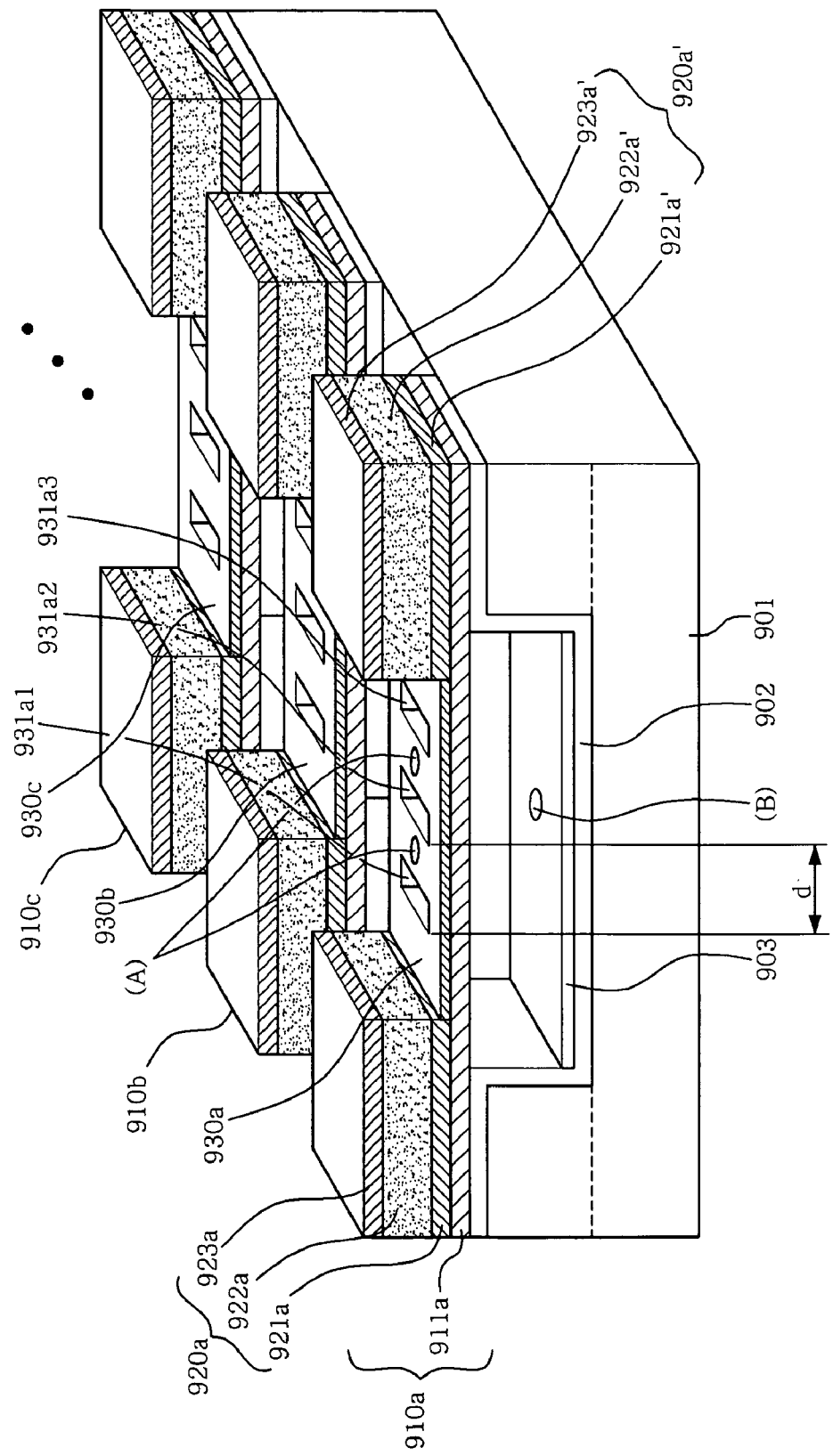
FIG. 7 is a diagram illustrating an embodiment of the diffractive optical modulator of FIG. 5.

Referring to FIG. 7, the open hole-based diffractive-type optical modulator according to the present invention includes a silicon substrate 901, an insulation layer 902, a lower micromirror 903, and a plurality of elements 910a to 910n. In this case, although the insulation layer and the lower micromirror are formed on different layers, the insulation layer itself may function as the micromirror when the insulation layer has the characteristic of reflecting light.

The silicon substrate 901 is provided with a recess to provide an air space for the elements 910a to 910n, an insulation layer 902 is disposed on the silicon substrate 901, a lower micromirror 903 is deposited on the insulation layer 902, and the lower surfaces of elements 910a to 910n are attached on the two sides of the recess. The silicon substrate 901 may be formed of a material, such as Si, $Al_2O_3$, $ZrO_2$, Quartz or $SiO_2$, and the bottom and top of the recess (in FIG. 7, indicated by dotted lines) may be formed of heterogeneous materials.

The lower micromirror 903 is deposited on the upper portion of the silicon substrate 901, and diffracts incident light by reflecting it. The lower micromirror 903 may be formed of a material such as metal (Al, Pt, Cr or Ag).

Each of the elements (although only a description of an element indicated by reference numeral 910a is representatively given, the others are the same) has a ribbon shape, and is provided with a lower support 911a, the lower surfaces of both ends of which are attached on two sides beside the recess of the silicon substrate 901 such that the center portion of the element is spaced apart from the recess of the silicon substrate 901.

Piezoelectric layers 920a and 920a' are provided on the two sides of the lower support 911a', and generate the drive force of the element 910a using the contraction and expansion of the piezoelectric layers 920a and 920a'.

A material forming the lower support 911a may be Si oxide-based material (for example, $SiO_2$), Si nitride-based material (for example, $Si_3N_4$), a ceramic substrate (Si, $ZrO_2$, or $Al_2O_3$), or Si carbide. The lower support 911a may be omitted according to need.

Furthermore, the left and right piezoelectric layers 920a and 920a' include lower electrode layers 921a and 921a' configured to provide piezoelectric voltage, piezoelectric material layers 922a and 922a' disposed on lower electrode layers 921a, 921a' and configured to generate upward and downward drive forces due to contraction and expansion when voltage is applied to the two sides thereof, and upper electrode layers 923a and 923a' disposed on the piezoelectric material layers 922a and 922a' and configured to provide piezoelectric voltage to the piezoelectric material layers 922a and 922a'. When voltage is applied to the upper electrode layers 923a and 923a' and the lower electrode layers 921a and 921a', the piezoelectric material layers 922a and 922a' are contracted or expanded, thus causing the lower support 911a to move upward or downward.

The electrodes 921a, 921a', 923a and 923a' may be formed of an electrode material, such as Pt, Ta/Pt, Ni, Au, Al, or $RuO_2$, and the electrode materials are deposited within a range of 0.01 to 3 µm using a sputter method, an evaporation method, or the like.

Meanwhile, an upper micromirror 930a is deposited on the center portion of the lower support 911a, and a plurality of open holes 931a1 to 931a3 are formed therein. In this case, although it is preferred that each of the open holes 931a1 to 931a3 be formed in a rectangular shape, they may be formed in any closed-curve shape, such as a circular shape or an oval shape. Furthermore, in the case where the lower support is formed of a light-reflective material, it is not necessary to separately deposit the upper micromirror, and it is possible to allow the lower support to function as the upper micromirror.

The open holes 931a1 to 931a3 allow light incident on the element 910a to pass through the element 910a and to be incident on the portions of the lower micromirror layer 903 corresponding to the open holes 931a1 to 931a4, thus allowing the lower micromirror layer 903 and the upper micromirror layer 930a to form pixels.

That is, as an example, portion (A) of the upper micromirror layer 930a, through which the open holes 931a1 to 931a3 are formed, and portion (B) of the lower micromirror layer 903 may form a single pixel.

In this case, incident light, which has passed through the portion of the upper micromirror layer 930a through which the open holes 931a1 to 931a3 are formed, can be incident on the corresponding portion of the lower micromirror layer 903. When the interval between the upper micromirror layer 930a and the lower micromirror layer 903 is an odd multiple of $\lambda/4$, maximally diffracted light is generated.

Meanwhile, the diffractive optical modulator 720 forms diffracted light by diffracting the linear light incident from the illumination lens system 710, and causes the diffracted light to be incident on the reflecting mirror 730.

Figure 8A:
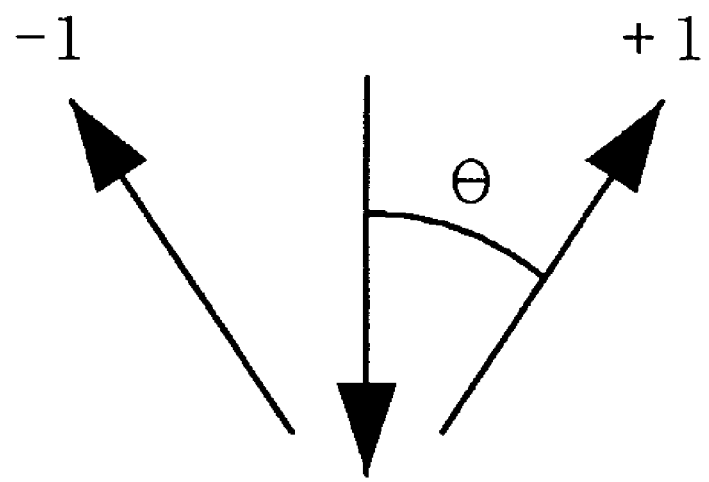
FIG. 8A and FIG. 8B are diagrams illustrating the diffraction angle of diffracted light generated by the diffractive optical modulator.
Figure 8B:
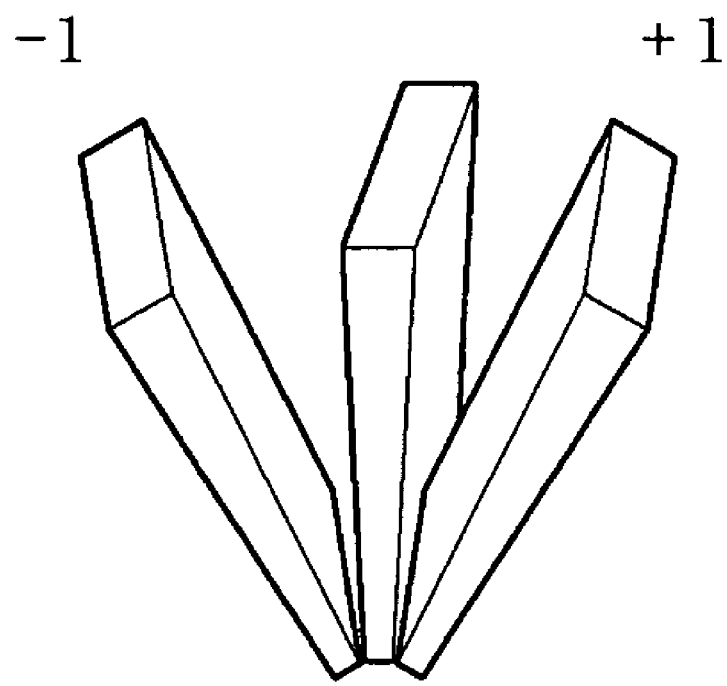

In this case, +1st order diffracted light and −1st order diffracted light, which are generated when the linear light incident from the illumination lens system 710 is vertically incident on the diffractive optical modulator 720, are shown in FIG. 8A and FIG. 8B schematically.

Referring to FIG. 8A, when incident light is vertically incident, +1st order diffracted light and −1st order diffracted light are formed in both directions. An angle θ spaced relative to the incident light is proportional to wavelength.

$\theta = a\sin(\lambda/d)$, where $\lambda$ is the wavelength, d is the distance or period between neighbor holes 931a1, . . . , 931a2 on the upper micromirror layer 930a That is, the longer the wavelength, the larger the angle θ.

FIG. 8B three-dimensionally shows +1st order linear diffracted light and −1st order linear diffracted light generated when linear parallel light is incident on a diffractive optical modulator.

Meanwhile, the reflecting mirror 730 is provided with a hole at the center thereof and passes incident reflected light therethrough, with an upper mirror 730a reflecting +1st order diffracted light to the relay lens system 740, and with a lower mirror 730b reflecting −1st order diffracted light to the relay lens system 740.

The relay lens system 740, as illustrated in FIG. 5, includes a Fourier lens 741 for separating diffracted light having various orders, a Fourier filter 742 for passing diffracted light having desired orders therethrough by filtering diffracted light having various orders separated by the Fourier lens 741, and an objective lens 743 for converting diffracted light, having passed through the Fourier filter 742. In a simplest case, the objective lens 743 may form a 1D pixel array image on the screen 770.

The numerical aperture reducer 750 reduces the numerical aperture of the diffracted light incident from the mirror 730 to the relay lens system 740, and emits the diffracted light having a reduced numerical aperture.

The projection system 760 projects the incident diffracted light onto the screen 770. That is, the projection system 760 functions to direct and focus the diffracted light incident from the relay lens system 740 onto the screen 770, thus forming a 1D pixel array image, and creates two-dimensional image by scanning 1D pixel array image. The projection system 760 includes a Galvano mirror 762, and also may includes additional lenses for refocusing and image correction.

The Galvano mirror 762 functions to perform two-dimensional image on the screen 770.

Figure 9A:
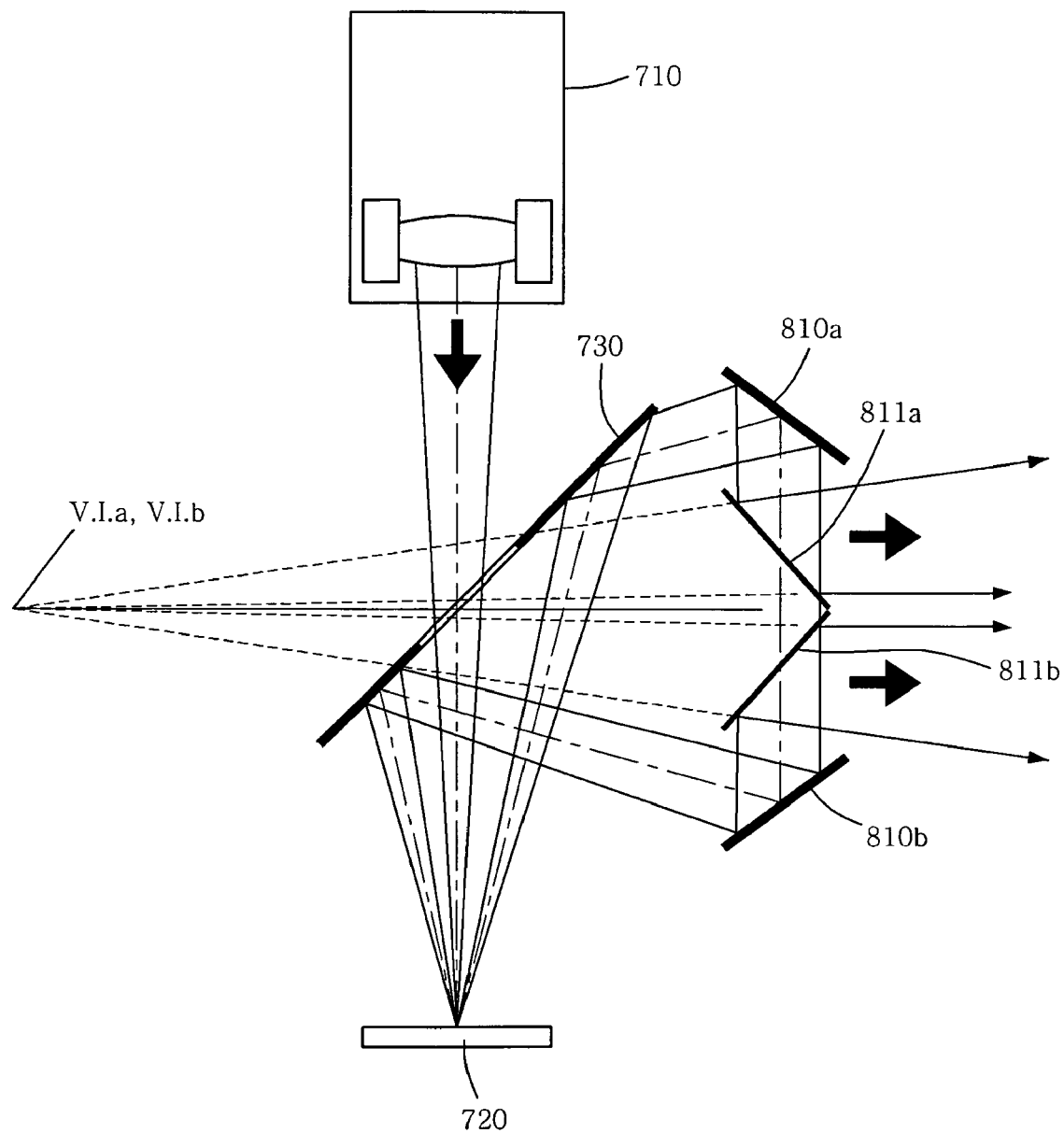
FIGS. 9A to 9E are diagrams illustrating embodiments of the numerical aperture reducer of FIG. 5.

FIG. 9A is a diagram illustrating an embodiment of the numerical aperture reducer of FIG. 5, which includes a pair of first reflecting mirrors 810a and 810b and a pair of second reflecting mirrors 811a and 811b. The numerical aperture reducer of FIG. 9A has a display optical structure FIG. 5. FIG. 9A illustrates the illumination lens system 710, the diffractive optical modulator 720 and the reflecting mirror 730, in addition to the numerical aperture reducer, in order to facilitate understanding.

In that case, the upper first reflecting mirror 810a functions to direct incident +1st order diffracted light toward the upper second reflecting mirror 811a, while the lower first reflecting mirror 810b functions to direct incident −1st order diffracted light toward the lower second reflecting mirror 811b.

Meanwhile, the upper second reflecting mirror 811a functions to direct the diffracted light incident from the upper first reflecting mirror 810a toward the relay lens system 740, while the lower second reflecting mirror 811b functions to direct the diffracted light incident from the lower second reflecting mirror 810b toward the relay lens system 740.

The second reflecting mirrors 811a and 811b should be tilted such that constructed by them virtual images V.I.a and V.I.b of the optical modulator overlap and coincide.

Accordingly, it can be understood that the numerical aperture of the diffracted light, having passed through the numerical aperture reducer 750, has been reduced.

Figure 9B:
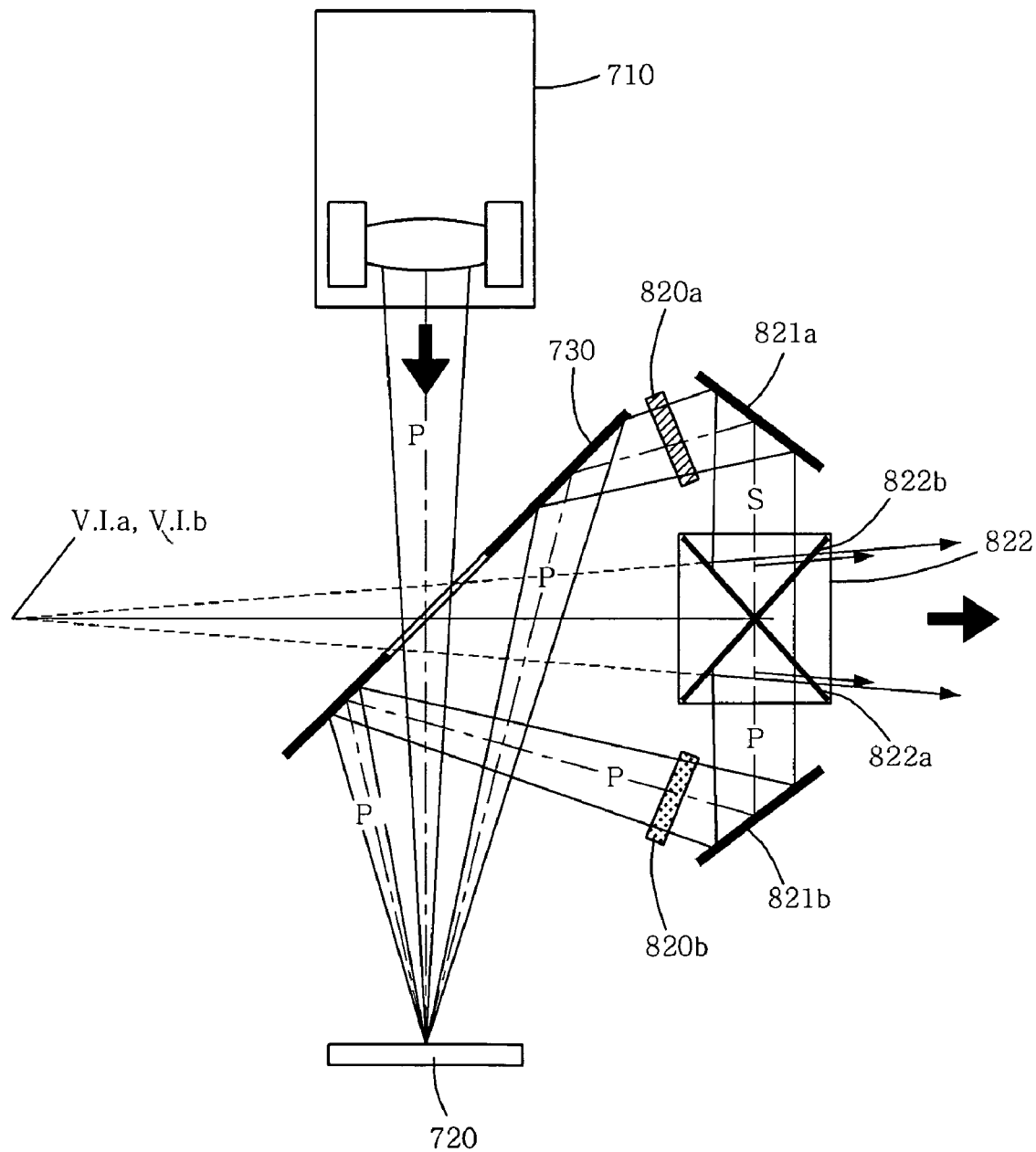

FIG. 9B is a diagram illustrating another embodiment of the numerical aperture reducer of FIG. 5, and includes a half-wavelength plate 820a, a dummy plate 820b, a pair of first reflecting mirrors 821a and 821b, and an X-cube 822.

The diffracted light incident on the first reflecting mirrors 821a and 821b is divergent light. FIG. 9B illustrates an illumination lens system 710, a diffractive optical modulator 720 and a reflecting mirror 730, in addition to the numerical aperture reducer, in order to facilitate understanding.

The light source 700 (not shown on FIG. 9B) provides P-polarized light beam and this type of polarization remains in diffracted light after reflection from optical modulator 720.

The half-wavelength plate 820a changes polarization of incident diffracted light into S-wave diffracted light when the incident diffracted light is P-wave diffracted light. The dummy plate 820b passes incident light therethrough without changing polarization.

The upper first reflecting mirror 821a functions to direct incident +1st order diffracted light toward the first reflecting surface 822a of the X-cube 822, while the lower first reflecting mirror 821b functions to direct incident −1st order diffracted light toward the second reflecting surface 822b of the X-cube 822.

The First reflecting surface 822a of the X-cube 822 totally transmits P-polarized light reflected from first reflecting mirror 821b, totally reflects S-polarized light reflected from first reflecting mirror 821a, and directs this S-polarized component toward relay lens system 740.

The first reflecting surface 822b of the X-cube 822 totally transmits S-polarized light reflected from first reflecting mirror 821a, totally reflects P-polarized light reflected from first reflecting mirror 821b, and directs this P-polarized component toward relay lens system 740.

S-polarized component and P-polarized components do not interfere with each other because of orthogonal polarization The diffracted light exiting from the X-cube 822 is incident on the relay lens system 740, so that two-dimensional image is achieved on the screen 770.

The position of the X-cube should be such that constructed by it virtual images V.I.a and V.I.b of optical modulator overlap and coincide.

Figure 9C:
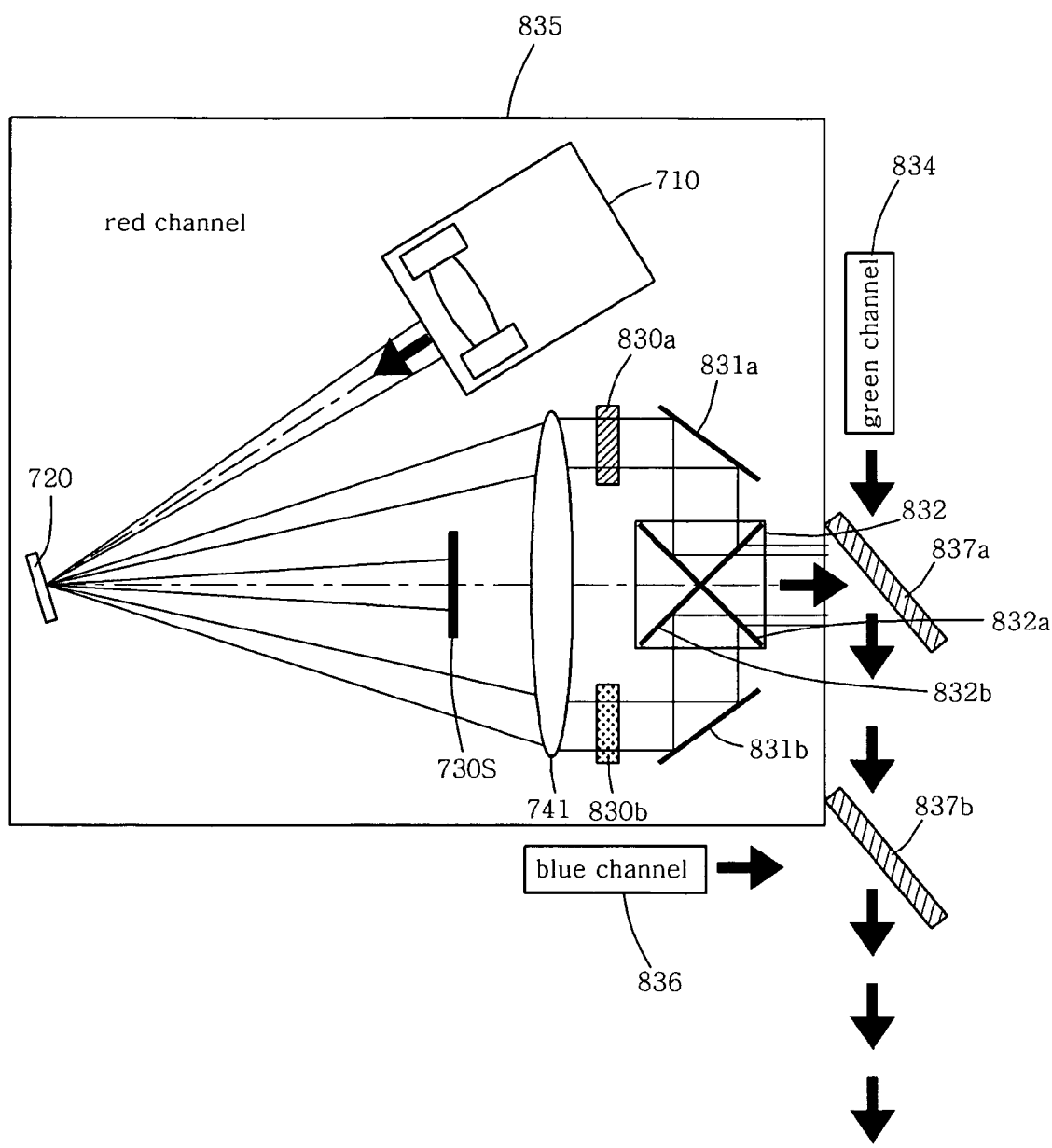

FIG. 9C is a diagram illustrating another embodiment of the numerical aperture reducer of FIG. 5, which includes a half-wavelength plate 830a, a dummy plate 830b, a pair of first reflecting mirrors 831a and 831b, and an X-cube 832.

The numerical aperture reducer of FIG. 9C has a display optical structure in which the Fourier lens 741 of the relay lens system 740 is included in FIG. 9C. The diffracted light incident on the first reflecting mirrors 831a and 831b is parallel light. FIG. 9C illustrates an illumination lens system 710, a diffractive optical modulator 720 and a blocking shutter 730S instead of the reflecting mirror 730, in addition to the numerical aperture reducer, in order to facilitate understanding.

The half-wavelength plate 830a polarizes incident diffracted light into S-wave diffracted light when the incident diffracted light is P-wave diffracted light, and polarizes incident diffracted light into P-wave diffracted light when the incident diffracted light is S-wave diffracted light. The dummy plate 830b passes incident light therethrough without polarizing it.

The upper first reflecting mirror 831a functions to direct incident+diffracted light toward the first reflecting surface 832a of the X-cube 832, while the lower first reflecting mirror 831b functions to direct incident−diffracted light toward the second reflecting surface 832b of the X-cube 832.

The diffracted light exiting from the X-cube 832 enters a first dichroic mirror 837a, is reflected by the first dichroic mirror 837a, and enters a second dichroic mirror 837b.

The first dichroic mirror 837a passes green diffracted light exiting from a green channel 834 therethrough and reflects red diffracted light exiting from a red channel 835, thus combining the green diffracted light and the red diffracted light with each other.

The second dichroic mirror 837b passes the composite light of the green diffracted light and the red diffracted light exiting from the first dichroic mirror 837a therethrough and reflects blue diffracted light exiting from a blue channel 836, thus combining the green diffracted light and the red diffracted light, which were combined in the first dichroic mirror 837a, with the blue diffracted light, and projecting this composite light onto the objective lens 743, so that two-dimensional image projection is achieved on the screen 770.

Figure 9D:
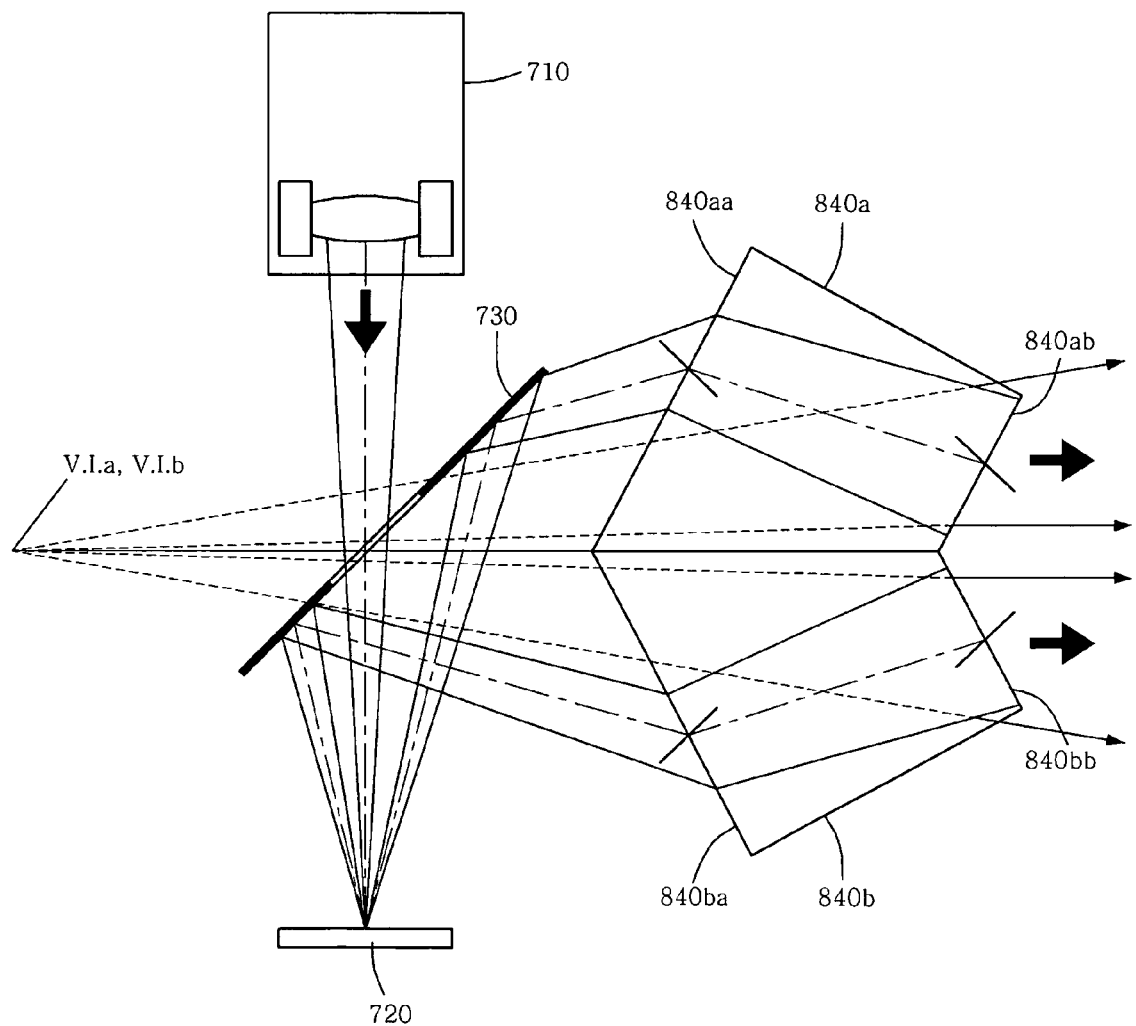

FIG. 9D is a diagram illustrating another embodiment of the numerical aperture reducer of FIG. 5, which includes a pair of prisms 840a and 840b. FIG. 9D illustrates an illumination lens system 710, a diffractive optical modulator 720 and a reflecting mirror 730, in addition to the numerical aperture reducer, in order to facilitate understanding.

In the upper prism 840a, an incident surface 840aa on which diffracted light incident from the reflecting mirror 730 is inclined with respect to the incident diffracted light. Accordingly, when the diffracted light enters, the path thereof moves inward, thereby reducing the numerical aperture.

In the upper prism 840a, an incident surface 840aa on which diffracted light is incident from the reflecting mirror 730 is not parallel to an exit surface 840ab through which the diffracted light exits. Accordingly, when the diffracted light exits, the diffracted light is divergent.

In the lower prism 840b, an incident surface 840ba on which diffracted light incident from the reflecting mirror 730 is inclined with respect to the incident diffracted light. Accordingly, when the diffracted light enters, the path thereof moves inwards, thereby reducing the numerical aperture.

In the lower prism 840b, an incident surface 840ba on which diffracted light is incident from the reflecting mirror 730 is not parallel to an exit surface 840bb through which the diffracted light exits. Accordingly, when the diffracted light exits, the diffracted light is divergent.

The exit surfaces 840ab and 840bb should be tilted such that constructed by them virtual images V.I.a and V.I.b of optical modulator overlap and coincide.

Figure 9E:
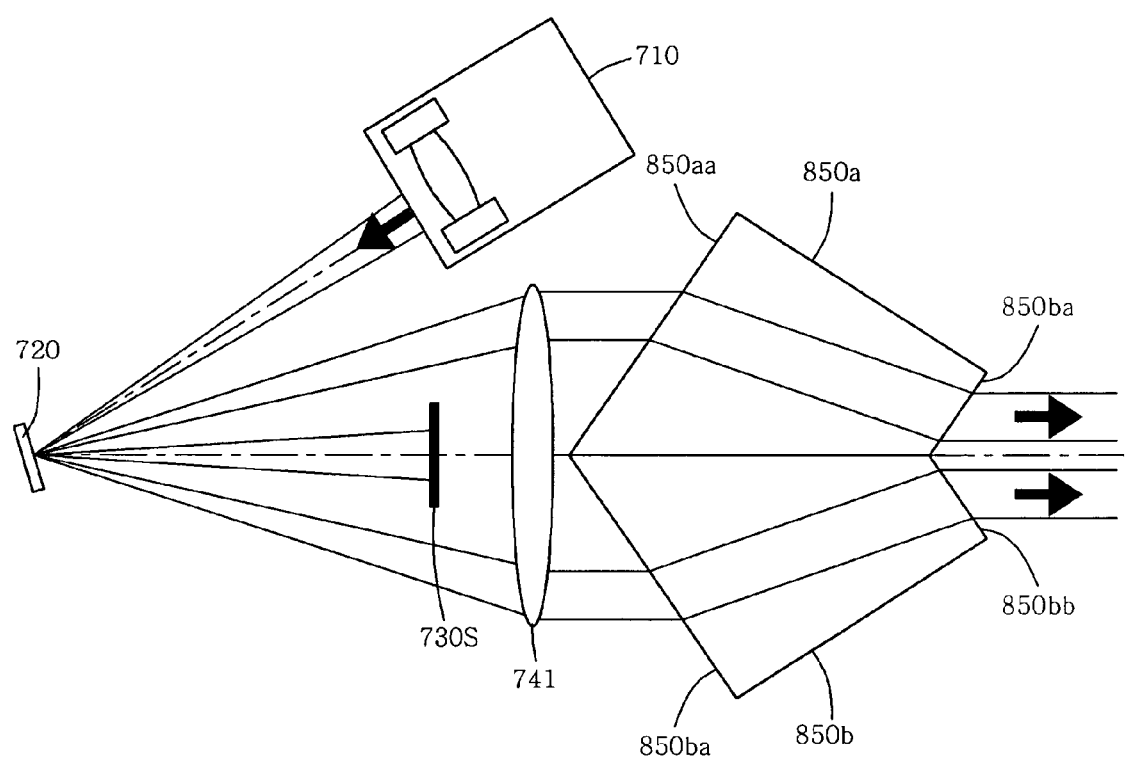

FIG. 9E is a diagram illustrating another embodiment of the numerical aperture reducer of FIG. 5, which includes a pair of prisms 850a and 850b. The numerical aperture reducer of FIG. 9E has a display optical structure in which the Fourier lens 741 of the relay lens system 740 is included in FIG. 9E. The diffracted light incident on the prisms 850a and 850b is parallel light. FIG. 9E illustrates an illumination lens system 710, a diffractive optical modulator 720, a reflecting mirror 730, and a Fourier lens 741, in addition to the numerical aperture reducer, in order to facilitate understanding.

In the upper prism 850a, an incident surface 850aa on which +1st order diffracted light incident from the reflecting mirror 730 is inclined with respect to the incident diffracted light. Accordingly, when the diffracted light enters, the path thereof moves inwards, thereby reducing the numerical aperture.

In the upper prism 850a, an incident surface 850aa on which diffracted light is incident from the reflecting mirror 730 is parallel to an exit surface 840ab through which the diffracted light exits. Accordingly, when the diffracted light exits, the diffracted light becomes parallel light.

In the lower prism 850b, an incident surface 850ba on which diffracted light incident from the reflecting mirror 730 is inclined with respect to the incident diffracted light. Accordingly, when the diffracted light enters, the path thereof moves inwards, thereby reducing the numerical aperture.

In the lower prism 850b, an incident surface 850ba on which diffracted light from the reflecting mirror 730 is incident is parallel to an exit surface 840bb through which the diffracted light exits. Accordingly, when the diffracted light exits, the diffracted light becomes parallel light.

According to the present invention, since the increase in the numerical aperture of lenses is not required even if a diffraction angle is increased, it is easy to design an optical system.

Furthermore, according to the present invention, since +1st order diffracted light and −1st order diffracted light can be gathered, it is possible to design a paraxial optical system, therefore lens performance is improved.

Furthermore, according to the present invention, since +1st order diffracted light and −1st order diffracted light can be gathered, it is possible to use a small-sized Galvano mirror, therefore a small display device can be implemented and manufacturing cost can be reduced.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A display device using an optical modulator equipped with a lens system having an improved numerical aperture, comprising:
   an illumination lens system for radiating light emitted from a light source;
   a diffractive optical modulator for generating diffracted light having a plurality of diffraction orders by modulating light incident from the illumination lens;
   a numerical aperture reducer for reducing a numeral aperture by causing positive order diffracted light and corresponding −1st order diffracted light of the diffracted light, which is generated by the diffractive optical modulator, to approach each other; and
   a projection system for condensing the diffracted light onto an object and performing scanning when the diffracted light having the reduced numerical aperture is emitted from the numerical aperture reducer.

2. The display device as set forth in claim 1, further comprising a relay lens system for selecting diffracted light having desired orders from among the diffracted light having the plurality of diffraction orders generated by the diffractive optical modulator, and passing the selected diffracted light therethrough.

3. The display device as set forth in claim 2, wherein the relay lens system comprises:
   a Fourier lens for increasing angles between a plurality of beams of the diffracted light having the plurality of diffraction orders, which is incident from the diffractive optical modulator, according to diffraction order; and
   a Fourier filter for selecting diffracted light having desired orders from among the diffracted light having the plurality of diffraction orders passed through the Fourier lens, and passing the selected diffracted light therethrough.

4. The display device as set forth in claim 3, wherein the relay lens system comprises an objective lens for converting the diffracted light, which is passed through the filter system, into parallel light.

5. The display device as set forth in claim 1, wherein the numerical aperture reducer comprises:
   a pair of first reflecting mirrors for changing light paths of the positive order diffracted light and −1st order diffracted light, which are emitted from the diffractive optical modulator, toward a median axis of the light paths; and
   a pair of second reflecting mirrors for directing the +1st order diffracted light and −1st order diffracted light, which are reflected by and incident from the pair of first reflecting mirrors, along a single light path and then causing the +1st order diffracted light and −1st order diffracted light to enter the projection system.

6. The display device as set forth in claim 5, further comprising a pair of third reflecting mirrors for causing the +1st and −1st order diffracted light of the diffracted light having the plurality of diffraction orders, which is emitted? from the diffractive optical modulator, to be incident on the respective first reflecting mirrors.

7. The display device as set forth in claim 6, wherein the pair of third reflecting mirrors is a single mirror that comprises a center hole for passing diffracted light having predetermined orders therethrough, and two side reflecting surfaces for respectively reflecting the +1st order diffracted light and the −1st order diffracted light to the first reflecting mirrors.

8. The display device as set forth in claim 5, further comprising:
   a blocking shutter for blocking diffracted light having predetermined diffraction orders that belongs to the diffracted light having the plurality of diffraction orders that is emitted from the diffractive optical modulator; and a Fourier lens for increasing angles between a plurality of beams of the diffracted light having the plurality of diffraction orders that is emitted from the diffractive optical modulator, and causing the +1st order diffracted light and −1st order diffracted light of the diffracted light having the plurality of diffraction orders to be respectively incident on the first reflecting mirrors.

9. The display device as set forth in claim 1, wherein:
the light incident from the illumination lens system is polarized light; and
the numerical aperture reducer comprises:
a pair of reflecting mirrors for changing light paths of the +1st order diffracted light and −1st order diffracted light, which are incident from the diffractive optical modulator, toward a median axis of the light paths,
a polarizing plate for changing polarization of diffracted light having any one diffraction order that belongs to the +1st diffracted light and −1st order diffracted light of the diffracted light having the plurality of diffraction orders that is emitted from the diffractive optical modulator, and
an X-cube for directing polarized diffracted light, which is reflected by and is incident from the pair of reflecting mirrors, and non-polarized diffracted light along a single light path, and causing the polarized diffracted light and the non-polarized diffracted light to enter the projection system.

10. The display device as set forth in claim 9, further comprising a pair of second reflecting mirrors for causing the +1st and −1st order diffracted light of the diffracted light having the plurality of diffraction orders, which is emitted from the diffractive optical modulator, to be respectively incident on the first reflecting mirrors.

11. The display device as set forth in claim 10, wherein the pair of second reflecting mirrors is a single mirror that comprises a center hole for passing diffracted light having predetermined orders therethrough, and two side reflecting surfaces for respectively reflecting the +1st order diffracted light and the −1st order diffracted light to the first reflecting mirrors.

12. The display device as set forth in claim 10, further comprising:
a blocking shutter for blocking diffracted light having predetermined diffraction orders that belongs to the diffracted light having the plurality of diffraction orders that is emitted from the diffractive optical modulator; and
a Fourier lens for increasing angles between a plurality of beams of the diffracted light having the plurality of diffraction orders that is emitted from the diffractive optical modulator, and causing the +1st and −1st order diffracted light of the diffracted light having the plurality of diffraction orders to be incident on the respective first reflecting mirrors.

13. The display device as set forth in claim 1, wherein the numerical aperture reducer comprises a pair of prisms for changing light paths of the +1st and −1st order diffracted light, which is incident from the diffractive optical modulator, toward a median axis of the light paths.

14. The display device as set forth in claim 13, further comprising a pair of reflecting mirrors for causing the +1st order diffracted light and −1st order diffracted light of the diffracted light having the plurality of diffraction orders, which is emitted from the diffractive optical modulator, to be incident on the respective prisms.

15. The display device as set forth in claim 14, wherein the pair of reflecting mirrors is a single reflecting mirror that comprises a center hole for passing diffracted light having predetermined orders therethrough, and two side reflecting surfaces for respectively reflecting the +1st order diffracted light and the −1st order diffracted light to the respective prisms.

16. The display device as set forth in claim 15, further comprising:
a blocking shutter for blocking diffracted light having predetermined diffraction orders that belongs to the diffracted light having the plurality of diffraction orders that is emitted from the diffractive optical modulator; and
a Fourier lens for increasing angles between a plurality of beams of the diffracted light having the plurality of diffraction orders that is emitted from the diffractive optical modulator, and causing the +1st and −1st order diffracted light of the diffracted light having the plurality of diffraction orders to be incident on the respective prisms.

* * * * *